United States Patent [19]

Anandan et al.

[11] Patent Number: 5,717,284
[45] Date of Patent: Feb. 10, 1998

[54] METHOD OF MANUFACTURING SUBSTANTIALLY FLAT COMPACT FLUORESCENT LAMP

[75] Inventors: Munisamy Anandan, Burlington; Jakob Maya, Brookline, both of Mass.

[73] Assignee: Matsushita Electric R & D Laboratory, Woburn, Mass.

[21] Appl. No.: 452,312

[22] Filed: May 26, 1995

[51] Int. Cl.$^6$ .................................. H01J 61/30
[52] U.S. Cl. ..................... 313/493; 313/634; 313/635
[58] Field of Search .......................... 313/493, 514, 313/519, 634, 635

[56] References Cited

U.S. PATENT DOCUMENTS

| | | | |
|---|---|---|---|
| 2,405,518 | 8/1946 | Polevitzky | 313/493 |
| 2,555,749 | 6/1951 | Krefft | 313/493 |
| 3,226,590 | 12/1965 | Christy | 313/493 |
| 3,258,630 | 6/1966 | Scott | 313/493 |
| 4,393,325 | 7/1983 | Van Der Kooi | 313/634 |
| 4,743,799 | 5/1988 | Loy | 313/493 |
| 4,924,143 | 5/1990 | Imamura et al. | 313/634 |
| 5,220,249 | 6/1993 | Tsukada | 313/493 |
| 5,479,069 | 12/1995 | Winsor | 313/634 |
| 5,479,071 | 12/1995 | Lynn | 313/514 |

*Primary Examiner*—Sandra L. O'Shea
*Assistant Examiner*—Vip Patel
*Attorney, Agent, or Firm*—Jerry Cohen

[57] ABSTRACT

Manufacture of a substantially flat compact fluorescent lamp using a molded cup-like continuous concentric (spiralled) channel and a circular plate, resembling a lid for the cup. The cup with the channel is coated with a light reflective layer followed by a phosphor layer (whereas the lid, on one side, is coated with the phosphor layer only) and has two holes through which two electrodes are sealed such that one of the said holes has, in addition to the electrode, an integral exhaust tubulation. The space between the cup and the lid is filled with a material capable of emitting ultraviolet under electrical excitation. Electrical discharge created between the electrodes, strictly follows the path of the channel physically imposed by the sealed structure, in spite of a nonsealed contact of the top surface of the channel walls and the plane surface of the lid. On absorption of the ultra-violet from the discharge, the phosphor emits visible radiation.

18 Claims, 6 Drawing Sheets

METHOD OF MANUFACTURING SUBSTANTIALLY FLAT COMPACT FLUORESCENT LAMP

CROSS-REFERENCE TO RELATED APPLICATION

Jakob Maya and Munisamy Anandan, "Substantially flat compact fluorescent lamp", application Ser. No. 08/291,887, filed Aug. 17, 1994 and assigned to the same assignee as the present application, discloses a novel substantially flat compact fluorescent lamp.

BACKGROUND OF THE INVENTION

1. Field of the Invention and Brief Preliminary Statement of It

The present invention relates to a method of manufacturing a 'substantially flat compact fluorescent lamp' with increased efficiency.

The present invention comprises such a lamp that utilizes a glass molded part comprising concentric channels with gas between its side walls disposed at a preferred angle (within an allowable range) and its top surface fine-ground to be in physical contact with a circular glass plate sealed to the molded part such that these areas of physical contact do not pass electrical discharge across them.

2. Description of the Prior Art

The traditional incandescent lamp (IL) generates a luminous flux of, typically, 16 lumens for an input electrical energy of 1 watt and has a life-span of about 750 hours. A compact fluorescent lamp (CFL), on the other hand, is approximately 4 times energy efficient and has a life anywhere from 6000 to 10,000 hours. Hence CFLs are increasingly being used for the conservation of energy and decrease of the replacement cost.

However, the advantages of CFL are not without a premium. The retrofitting of IL involves high degree of compactness for the structure of CFL. Well known techniques of obtaining the compactness are through bending the typical glass tube into (i) circular form (ii) U-shape (iii) double-U (iv) triple-U and (v) quadruple-U. Generally, the arc-length needs to be increased to obtain high light output. The above complicated bending makes it difficult to maintain high degree of compactness and enhanced arc-length to achieve high light output. In spite of the complex bending, the CFLs tend to be long necessitating external fixtures if these lamps are to be employed for preferential directional lighting. Other associated problems of the compactness are (a) excessive heating and (b) increased phosphor loading. Excessive heating results in high mercury vapor pressure beyond the optimum value needed for maximum luminous efficiency and increased operating temperatures for the electrical components employed at the base of the lamp, thus deteriorating the life of the components and hence the lamp. Increased phosphor loading leads to the faster phosphor degradation and hence the light output. There are known techniques to solve these problems, but not without additional costs and compromises.

U.S. Pat. No. 3,226,590 to Christy, employed a large area substantially flat fluorescent lamp called the "panel lamp" that consisted of two corrugated glass plates laid over each other and sealed to withstand the atmospheric pressure by virtue of its corrugation and seal pattern. The electrical discharge path was in the shape of a serpentine or labyrinthine channel. A similar corrugated structure was adopted for a round substantially flat lamp, as shown in U.S. Pat. No. 3,243,630 to W. C. Martyny, with a central hole through which no light was generated.

Lamps made in accordance with the above patents are not practical for retrofitting into incandescent lamp applications.

The illustrated limitations and problems of the conventional compact fluorescent lamps are overcome by the substantially flat compact fluorescent lamp described and claimed in U.S. patent application Ser. No. 08/291,887, filed Aug. 17, 1994, entitled, "Substantially Flat Compact Fluorescent Lamp"—by Jakob Maya and Munisamy Anandan and assigned to the same assignee as the present invention.

An object of the present invention is to provide a cost-effective product and substantially flat compact fluorescent lamp product and method of manufacture of it overcoming the above difficulties.

SUMMARY OF THE INVENTION

The objects are met by use of a glass-molded part for the manufacturing of the lamp, to provide a substantially flat lamp whereby the angle of the channel walls is adjusted to yield optimum light distribution and efficiency. In this product unwanted gas discharge paths are suppressed by minimizing the physical gaps in the lamp rather than sealing the gaps. The invention provides a substantially flat light source with high brightness and uniform intensity across a front surface for use in applications where brightness uniformity is highly desirable. The generated visible light is extracted from the lamp by the proper design of the angle of the walls of the molded part of the lamp.

The substantially flat compact fluorescent lamp is based on a glass-molding technique.

The main starting blank for the manufacture of the lamp resembles a cup with channels formed by glass molding technique. These channels run continuously from the periphery to the center with side walls of the blank disposed at a range of preferred angles to the bottom horizontal surface. The top surface of the channel walls are fine-ground with all the internal surfaces of the said cup being coated with a reflective coating followed by a light-emissive coating, such as phosphor.

Two electron-emissive electrodes are provided. One of them is integrated to a flare with an exhaust tubulation which embraces a mercury dispenser integral with a getter ring. The other with only the flare is integrated with the end opposite to the electrode closed, is sealed into the two holes integral with the said molded cup at peripheral and the central locations such that the electrode with the exhaust tubulation occupies the central hole for stability during the subsequent processing of the lamp.

In a preferred embodiment, the electrodes are disposed deep into the holes, for the generation of light of equal intensity as the surroundings, over the electrode regions. This results in the formation of positive column over the electrodes when viewed end on and thus reduces the dimness usually encountered in the region in close proximity to the electrodes.

A circular glass plate is provided in conformity with the outer diameter of the said processed molded cup. The plate is coated with a thin layer of phosphor, laid flat on the ground surface of the cup and sealed to the cup after preferentially removing the phosphor layer in the region of sealing such that the surface of the circular plate with its phosphor layer physically touches the ground surfaces of the said processed cup. The space between the cup and circular plate is evacuated through the exhaust tubulation and filled with a buffer gas after activating the electron-emissive electrodes. The mercury dispenser, integral with a getter, is activated and the mercury is dispensed into the active region between the electrodes and the lamp is aged and stabilized.

Other objects, advantages and features of this invention will become apparent in conjunction with the following drawings in which:

DETAILED DESCRIPTION OF PREFERRED EMBODIMENTS

Figure 1:
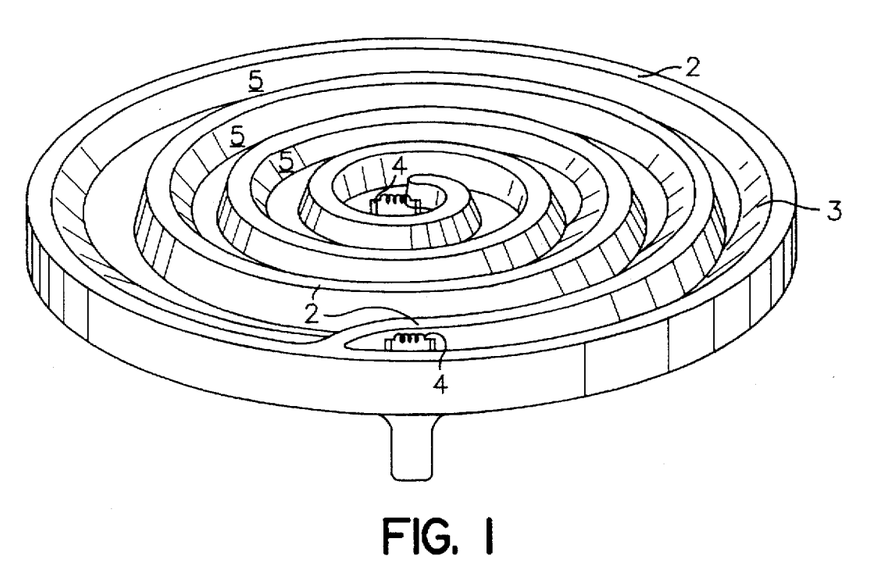
FIG. 1 is an isometric view of the molded glass cup and in a preferred embodiment of practice of the method of the invention installed with two filaments, omitting the internal coatings for clarity.

FIG. 1 is an isometric view of the molded glass cup, containing the electron-emissive electrodes 4, illustrating the disposition of concentric channels 5 and the slope 3 of the side walls of the channels, omitting the internal coatings for clarity. The top surfaces 2 of the channel walls are fine ground.

Figure 2:
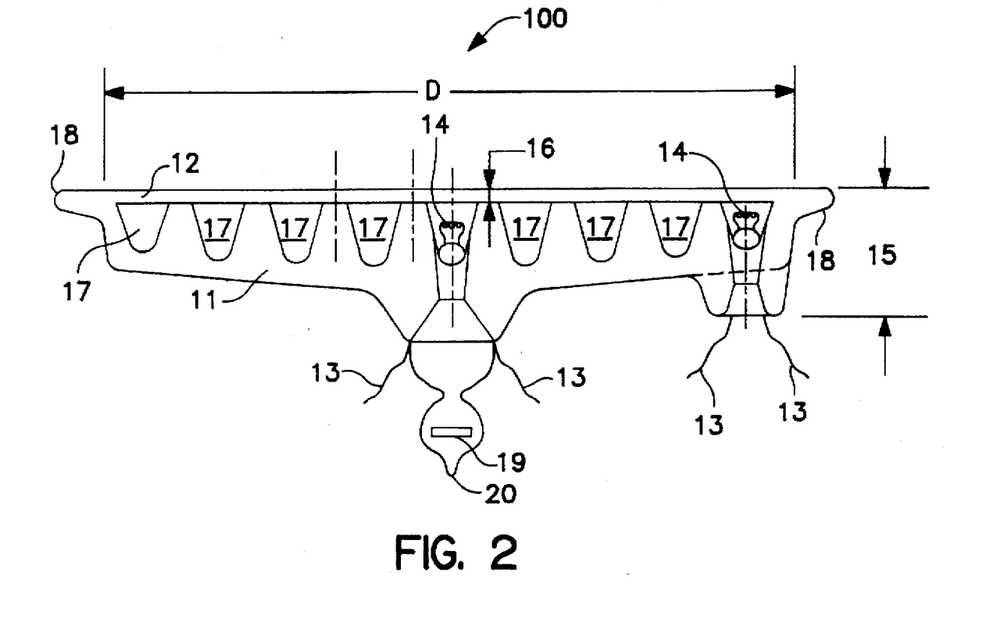
FIG. 2 is a cross-sectional view of the substantially flat compact fluorescent lamp employing such a molded glass cup, in accordance with the present invention.

FIG. 2 shows the overall construction of a fully assembled substantially flat compact fluorescent lamp 100 according to the present invention. The present invention is related to the substantially flat compact fluorescent lamp disclosed in the U.S. patent application Ser. No. 08/291,887 dated Aug. 17, 1994, assigned to the assignee of the present application.

In FIG. 2 the assembled lamp 100 has a molded glass cup 11 which contains internally coated (seen in FIG. 3) concentric channels 17 (details better seen in FIGS. 1, 4, and 5) two holes into which are sealed two electron emissive electrodes 14 which have external leads 13. An exhaust tubulation integral with the electrode 14 at the central channel houses a getter and mercury dispenser 19 and is sealed off at 20 after the lamp has been subjected to a vacuum exhaust processing. A phosphor coated (seen in FIG. 3) circular flat glass plate 12 of diameter D (5¼" in a preferred geometry) is sealed to the molded cup 11 at the seal region 18 such that the clearance 16 between the circular plate and the top surfaces of the channel walls is less than 0.001". In a preferred sealed unit the height 15 of the assembly from the bottom of the circumferential electrode seal to the top of the circular plate is 0.94" whereas a similar dimension from the bottom of the central electrode seal is 1.13".

Figure 3:
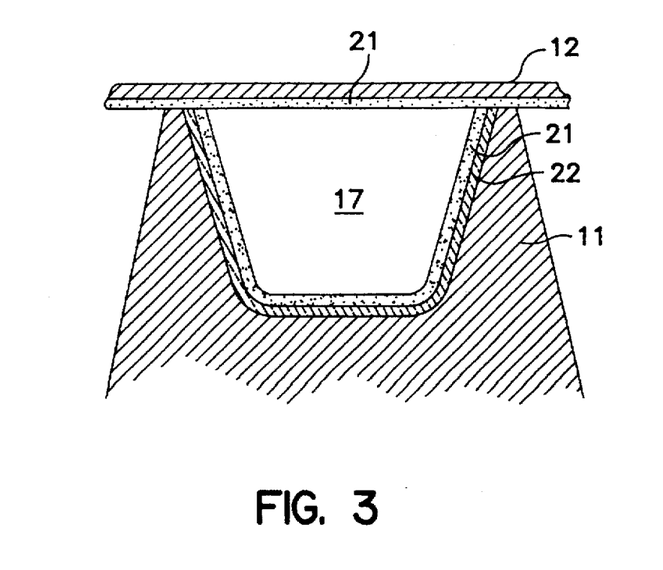
FIG. 3 is an expanded view of the cross-section of closed channel formed by sealing the top plate and the molded glass cup of FIG. 2.

In FIG. 3 the details of the internal coatings both on the circular glass plate 12 and the channels of the molded glass cup 11 are illustrated in cross-section for one channel. The circular glass plate 12 has a phosphor layer 21 on the side facing the channel 17 and the molded glass cup has a phosphor layer 21 followed by a reflective layer 22.

Figure 4:
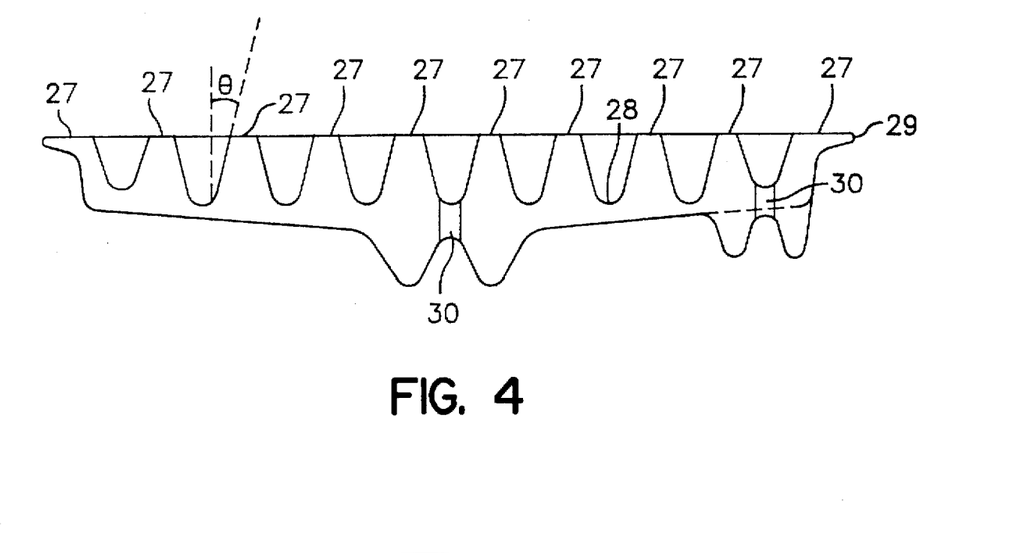
FIG. 4 is a cross-sectional view of the molded glass cup.

FIG. 4 is a cross-sectional view of the molded glass cup containing two holes 30 for sealing electron-emissive electrodes and concentric channels 28 for electrical discharge to run from one electrode to the other. The top surfaces 27 of the channel walls are fine-ground and the side wall of the channels disposed of at a preferred angle Ø=16°. In a preferred structure the channel width at the top surface is 0.42" and the channel height is 0.4". A flared edge 29 is another part of the molded cup for ease of sealing to the top circular glass plate by flame sealing technique.

Figure 5:
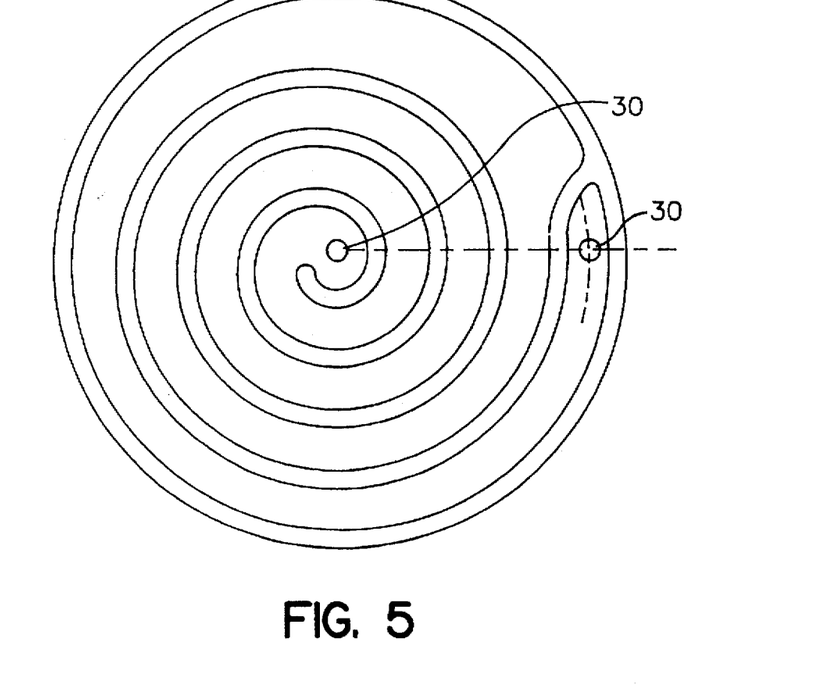
FIG. 5 is the plan view of the molded cup.

FIG. 5 is a top open end view of FIG. 4 depicting the continuity of channels with two holes 30, one at the center and the other at the periphery of the molded cup and in a preferred structure the diameter of the holes is 0.5".

Figure 6:
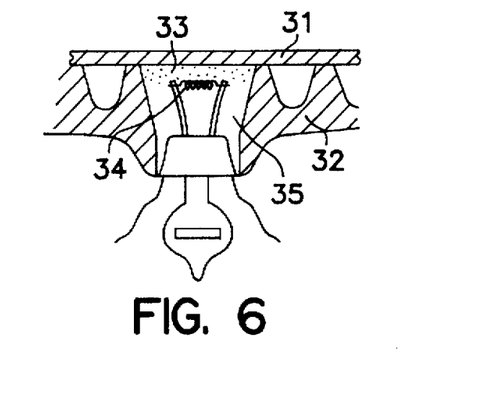
FIG. 6 is the cross-sectional view of the disposition of the electron emissive electrode inside the central channel formed by sealing the top plate to the molded glass cup, omitting the internal coatings for clarity.

FIG. 6 depicts a cross-sectional view of the electron-emissive electrode 34 sealed into the center channel 35 of the glass molded cup 32 which in turn is sealed to the top circular glass plate 31. Under typical lamp operating conditions the formation of the negative glow region 33 over the electrode 34, due to the proximity of the electrode to the top plate 31, is shown above the electrode 34.

Figure 7:
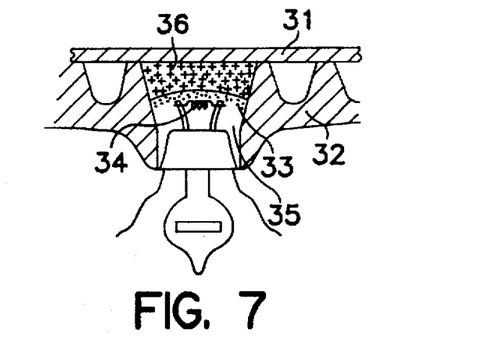
FIG. 7 is the same cross-section as in FIG. 6 but with the electron emissive electrode lowered inside the channel.

FIG. 7 shows the same cross-section as in FIG. 6 but with the electrode 34 lowered inside the channel 35. The formation of both positive column 36 and negative glow 33 over the electrode 34, due to the increased distance of the electrode from the top plate 31, is shown.

Figure 8:
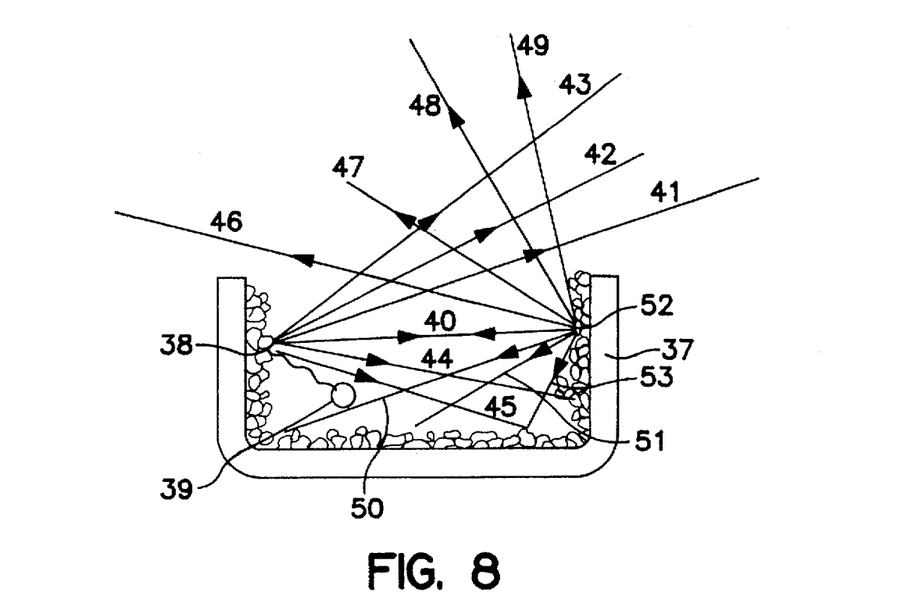
FIG. 8 is the cross-section of the channel with its side wall straight and the visible rays of light bouncing off the surfaces.

FIG. 8 shows cross-section of a channel with side wall 37 being straight and the generation and direction of travel of light upon the incidence of UV photon 39 produced in a typical lamp discharge on a phosphor site 38. The FIG. 8 also shows the Lambertian distribution of generated light at the site 38 with peak of the distribution occurring in a direction 40 normal to the side wall. Also shown are the rays of light 42, 43, 44 and 45 at different angles to the normal, the scattered rays of light 46, 47, 48, 49, 50, 51 and 53 at the scattering site 52.

Figure 9:
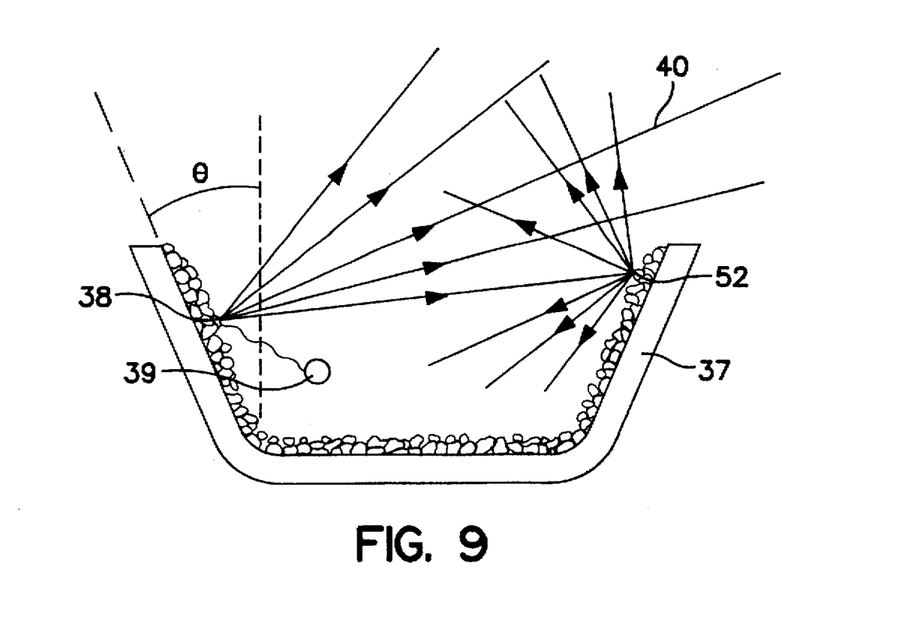
FIG. 9 is the same cross-section of the channel but with the side wall angularly disposed.

FIG. 9 illustrates a similar cross-section as in FIG. 8 but with the side wall 37 of the channel inclined at angle Ø. The incidence of UV photon at the phosphor site 38 and the resulting light generation, distribution and direction of travel with peak 40 in the distribution escaping the channel, are all shown. The effect of angle Ø on the extraction of the generated light and the resulting brightness increase due to the escape of the peak in the lambertian distribution is evident.

Figure 10:
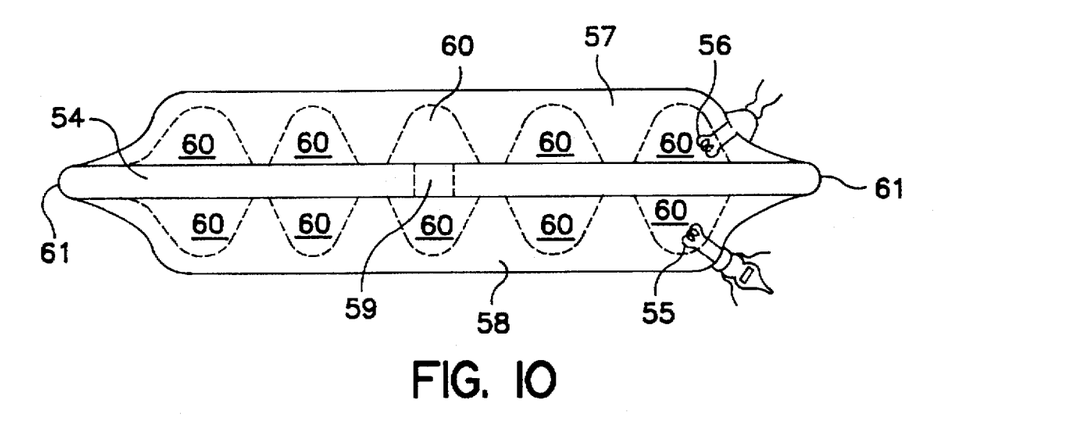
FIG. 10 is the cross-section of the two-tier structure of the substantially flat compact fluorescent lamp employing two molded cups.

FIG. 10 shows the two tier structure of the cross section of the substantially flat compact fluorescent lamp employing two molded cups 57 and 58, containing channels 60, two electron emissive electrodes 55 and 56, and a circular plate 54 containing a hole 59 at the center for the electrical discharge to connect the two tiers which are sealed to the circular plate in the region 61.

A preferred method of manufacture of the lamp 100 (FIG. 2) is described below:

(1) The first step in the manufacturing sequence is the molding of the glass cup with concentric channels. Two holes 30 of diameter 0.5", as shown in FIG. 5, are either drilled or molded along with the cup and the top surfaces 27 of the channel walls are fine-ground to a flatness of 0.001. The molding technique employed for the prototype is "press molding" and this technique has the advantage of realizing complex patterns with desired accuracy. However, this technique has a limitation on thickness of glass wall and thus it is difficult to achieve wall thickness of less than 0.125". The market demands the compact fluorescent lamps to be light weight and hence a need exists for the reduction of weight of the molded glass part. Alternative well known techniques for achieving lower wall thickness are "blow-molding", "vacuum molding" and "sag-molding". Blow-molding technique is advantageous for glass parts which have sufficient depth parameter. As the lamp of the present invention is flat and the geometry is shallow, blowmolding is not desirable. The vacuum molding draws and presses the molten glass into the mold by vacuum suction and can also be employed to generate the molded part used in this invention. "Sag-molding" relies on a glass plate being softened and dropping freely into the mold. Some variations of these molding techniques are "vacuum assisted blow-molding" and "sag-molding".

(2) As soon as the part is molded, the part is subjected through an annealing cycle in an annealing oven just next to the molding. The molded glass cup is cleaned and a reflective layer 22 (FIG. 3) is coated on the inner side of the channel walls and the coated cup is baked at 350° C. for 15 minutes and further heated to 450° C. in air, held for one hour and cooled down. A phosphor layer 21 (FIG. 3) is coated over the reflective layer 22 and an identical heat cycle as for reflective layer is followed.

(3) A circular glass plate 12 (FIG. 2) of ⅛" thick is cleaned and coated with a phosphor layer and subjected to heat treatment identical to the said reflective layer treatment. The phosphor layer is removed to a width of ⅛" from the edge of the circumference of the round plate over the entire circle for the ease of sealing to the molded cup at the region 18 (FIG. 2).

(4) A similar removal of the phosphor layer is carried out inside the holes 30 (FIG. 4) for ease of sealing the electron-emissive electrodes 14 (FIG. 2). The top surfaces of the molded cup are cleaned of any coating and the circular plate 12 (FIG. 2) is placed well in contact with the top surfaces of the molded cup and sealed only at the circumference in the region 18 (FIG. 2). The skirt 18 is an integral portion of the molded part and is so designed to thin down radially over sufficient length for the ease of flame sealing.

(5) Vacuum-chucking is employed to align and lay the lid 12 flat on the surfaces 27 (FIG. 4) prior to flame sealing. As the molded part in the present invention has sufficient wall thickness exceeding 0.125", preheating, flame-sealing and subsequent annealing are very critical. The physical gap 16 (FIG. 2) between the top surfaces of the channel walls and the circular plate, as a result of this sealing, is less than 0.001". This gap will be further reduced when the space between the circular plate and the molded cup is under low pressure because of the atmospheric pressure acting on the circular plate. The gap 16 is critical for the prevention of radial discharge across the channels.

(6) The next step in the sealing is the sealing of electron-emissive electrodes 14 (FIG. 2). A glass flare containing the electron-emissive electrode, an exhaust tabulation and a getter with mercury dispenser is sealed into the central hole of the molded cup such that the horizontal level of electrode 14 is approximately 0.25" below the phosphor layer of the circular plate 12. This ensures the formation of positive column 36 (FIG. 7) over the negative glow 33, all occurring over the top of the electrode. This formation enhances the light output and uniformity of light distribution across the surface, when viewed end-on, over the top of the electrode because of the increased UV generation efficiency of positive column in comparison to negative glow. In the event of the electrode being in close proximity with the top circular plate, only the negative glow will form in front of the electrode and the positive column will be adjacent to it. When viewed end on the region over the electrode will be relatively dark due to the inefficient generation of UV by the negative glow.

(7) The second electrode is sealed into the hole at the periphery of the molded cup in the same manner except that the flare containing the second electrode is closed at the outside. As the wall thickness of the protrusion of the molded cup exceeds 0.125", the preheating, sealing and subsequent annealing are all critical to minimize strain for the prevention of cracks.

(6a–7a) An alternative method of sealing the lid to the cup and the flares to the holes, simultaneously is by the use of glass-frit. Preformed frit rings of the correct diameters are placed over the part to be sealed and pressed against the opposing surfaces to be sealed. The unit assembled in this way is sent into a traveling belt furnace with a series of temperature zones imparting preheating, sealing and annealing to the assembly. At a predetermined belt speed the units enter and exit the oven with well annealed frit seal.

(8) The sealed unit is vacuum processed, inert gas-filled and sealed off. After the seal-off, the getter is activated and the mercury is dispensed into the lamp and the lamp is aged and stabilized.

A prototype of the lamp made according to the present invention and tested yielded 1500 lumens at 20 W of power with the lamp voltage at 207V at a lamp current of 120 ma.

Certain key advantages of the present invention are clear from the facts that (i) a glass molded cup has the ease of mass manufacturing the lamp (ii) angular disposition of the side walls of the channels extracts the generated light more effectively than a straight side wall as illustrated in FIG. 8 and FIG. 9 (iii) the disposition of the electrodes increases the light output on top of the electrodes (iv), suppression of radial discharge is achieved by close control over the gap between the top plate and the top surfaces of the molded cup rather than the laborious procedure of sealing the gap (v) finally the whole lamp is flat and compact.

It will be understood that one skilled in the art could modify the above dimensions and geometry and thus that the above description of the present invention covers such modifications, changes and adaptations. By way of example, the number of channels, channel width, channel height and the angle of inclination of the side walls of the channels can be increased or decreased without changing the outer diameter of the molded cup and the circular plate and thus change the lumen package. Similarly, the geometry of the molded part can be changed to derive rectangular, square or oval flat lamps. It is further understood that deviations from the particular sequence of fabrication steps as well as other substitutions are covered by the present invention.

An alternative embodiment of the invention may relocate the electron-emissive electrodes. In other preferred embodiments one more tier of this lamp can be integrated to increase the lumen package. An example of an increased lumen package is illustrated in FIG. 10. In this structure, two pieces of the same molded cup are employed to construct a two-tier lamp by sealing the cups 57 and 58 to a circular plate 54, containing a central hole 59 for the continuity of electrical discharge from the bottom tier to the top tier, at regions 61. The electrical discharge from electrode 55 goes through the channels 60 at the bottom cup 58, through the central hole 59, through concentric channels starting from the center to the periphery and finally to the electrode 56.

In another alternative embodiment, the inner surfaces of the lamp is covered with visible and ultraviolet radiation reflecting material, such as $Al_2O_3$, $SiO_2$, etc., everywhere except the viewing surfaces.

It will be now apparent to those skilled in the art that other embodiments, details and uses can be made consistent with the letter and spirit of the foregoing disclosure and within the scope of this patent, which is limited only by the following claims, construed in accordance with the patent law, including the doctrine of equivalents.

What is claimed is:

1. A substantially flat electric discharge compact fluorescent lamp comprising:
   (a) a molded cup, containing a continuously running channel with side walls inclined at an obtuse (over 90°) angle to the bottom surface of the channel;
   (b) the channel internal surfaces coated with a reflective layer overlaid with a coating of a phosphor layer;
   (c) a phosphor coated cover plate substantially equal to the outer span of the said molded cup;
   (d) the plate being sealed to the molded cup only at the cup periphery such that the gap between the phosphor layer on the plate and the top surfaces of the channel walls is minimized to suppress radial discharge across the channels when the lamp is in regular operation;
   (e) means defining two electron-emissive electrodes on glass flares of the cups, one with integral exhaust tubulation and a mercury dispensing gutter and the other with its external end closed, the electrodes being sealed into two holes of the molded cup in a manner that the electrode with the exhaust tubulation occupies the central hole with its electron-emissive surface sufficiently below the phosphor layer, on the rod plate, so as to form a positive column over the electrode, in the regular operation of the lamp, where viewed end-on and the other electrode with its external end of the flare closed, is sealed into the hole at the periphery of the molded cup in the same level as the electrode occupying the central hole of the molded cup; and
   (f) the lamp being filled with inert gas, and wherein; the angle of inclination of the side walls of the channel being in a definite relationship to the height and width of the channel for maximum efficiency and a typical range of angles (to the horizontal plane) is 106° to 135° for a height to width ratio of about 2.

2. A molded glass cup as defined in claim 1 wherein the angle of inclination of the side walls of the channel is uniform for all channels over the entire length of the arc.

3. A molded glass cup as defined in claim 1 wherein the channel runs continuously from one electrode to the other with a uniform trapezoidal or rectangular or square or circular, or oval cross-section or variations of these cross-sections.

4. A molded glass cup as defined in claim 1 wherein the channels are elongated and parallel.

5. A lamp as defined in claim 1 wherein the two cup holes are at the outer channel with a partition in between or the two holes are at the center with the partition in between and the channel joins them in a continuous path.

6. A lamp as defined in claim 1 wherein the one plate phosphor layer has a surface density equal to or less than the surface density of the phosphor layer on the inner surfaces of the molded glass cup, for better utilization of UV and transmission of the generated visible light.

7. A lamp as defined in claim 6 wherein the phosphor layer on the plate is constructed to suppress the radial discharge across the channels by way of its proximity or contact with the top surfaces of the channel walls.

8. A lamp as defined in claim 6 wherein the plate phosphor layer is in the pattern of a spiral conforming to the topology of the spiral channel on the molded glass cup and the color of the phosphor different for each channel.

9. A lamp with a molded glass cup as defined in claim 1 wherein the reflective layer is selectively coated in any manner to direct the light in a preferential direction.

10. A lamp with a molded glass cup as defined in claim 1 wherein the top surfaces of the channel walls are polished to transmit some light through them for better uniformity of light over the viewing circular plate.

11. A lamp as claimed in claim 1 with frit-sealing of the circular glass plate to the molded glass cup and frit-sealing of flares containing the electron-emissive electrodes to the molded glass cup.

12. A lamp as described in claim 1 wherein the top plate and the lip of the molded part extend beyond the periphery of the main body to facilitate flame sealing of both parts.

13. A lamp as defined in claim 1 wherein the clearance between the circular plate and the top walls, except at the periphery, is sufficient to prevent radial electrical discharge across the channels.

14. A lamp with a molded glass cup as defined in claim 1 wherein the angle of inclination of the side walls of the channel varies from channel to channel.

15. A lamp with a molded glass cup as defined in claim 1 wherein the angle of inclination of the side walls of the channel is non-uniform within the channel.

16. A substantially flat electric discharge compact fluorescent lamp comprising:
   (a) a molded cup, containing a continuously running channel with side walls inclined at an obtuse (over 90°) angle to the bottom surface of the channel;
   (b) a reflective layer coating on the channel internal surfaces overlaid with a phosphor layer coating;
   (c) a phosphor coated cover plate substantially equal to the outer span of the said molded cup;
   (d) the plate being sealed to the molded cup only at the cup periphery such that the gap between the phosphor layer on the plate and the top surfaces of the channel walls is minimized to suppress radial discharge across the channels when the lamp is in regular operation;
   (e) the lamp being filled with inert gas, and wherein
   (f) the lamp as a whole is constructed and arranged for electrodeless activation; and
   a molded class cup as in claim 1 with the angle of inclination of the side walls of the channel being in a definite relationship to the height and width of the channel for maximum efficiency and a typical range of angles (to the horizontal plane) is 106° to 135° for a height to width ratio of about 2.

17. A substantially flat electric discharge compact fluorescent lamp comprising:
   (a) a molded cup, containing a continuously running channel with side walls inclined at an obtuse (over 90°) angle to the bottom surface of the channel;
   (b) the channel internal surfaces coated with a reflective layer overlaid with a coating of a phosphor layer;

(c) a phosphor coated cover plate substantially equal to the outer span of the said molded cup;

(d) the plate being sealed to the molded cup only at the cup periphery such that the gap between the phosphor layer on the plate and the top surfaces of the channel walls is minimized to suppress radial discharge across the channels when the lamp is in regular operation;

(e) means defining two electron-emissive electrodes on glass flares of the cups, one with integral exhaust tabulation and a mercury dispensing getter and the other with its external end closed, the electrodes being sealed into two holes of the molded cup in a manner that the electrode with the exhaust tabulation occupies the central hole with its electron-emissive surface sufficiently below the phosphor layer, on the top plate, so as to form a positive column over the electrode, in the regular operation of the lamp, where viewed end-on and the other electrode with its external end of the flare closed, is sealed into the hole at the periphery of the molded cup in the same level as the electrode occupying the central hole of the molded cup; and (f) the lamp being filled with inert gas, and wherein;
the angle of inclination of the side walls of the channel is in a definite relationship to the height and width of the channel for maximum efficiency and a typical range of angles (to the horizontal plane) is 106° to 135° for a height to width ratio of about 2.

18. A substantially flat electric discharge compact fluorescent lamp comprising:

(a) a molded cup, containing a continuously running channel with side walls inclined at an obtuse (over 90°) angle to the bottom surface of the channel;

(b) a reflective layer coating on the channel internal surfaces overlaid with a phosphor layer coating;

(c) a phosphor coated cover plate substantially equal to the outer span of the said molded cup;

(d) the plate being sealed to the molded cup only at the cup periphery such that the gap between the phosphor layer on the plate and the top surfaces of the channel walls is minimized to suppress radial discharge across the channels when the lamp is in regular operation; and a molded glass cup as in claim 1 with the angle of inclination of the side walls of the channel being in a definite relationship to the height and width of the channel for maximum efficiency and a typical range of angles (to the horizontal plane) is 106° to 135° for a height to width ratio of about 2.

* * * * *